(12) United States Patent
Lee et al.

(10) Patent No.: US 7,209,947 B1
(45) Date of Patent: Apr. 24, 2007

(54) DATA NETWORK-ASSISTED CONFERENCE ESTABLISHMENT

(75) Inventors: Chinmei Chen Lee, Woodbridge, IL (US); Douglas William Varney, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/565,660

(22) Filed: May 5, 2000

Related U.S. Application Data

(60) Provisional application No. 60/163,646, filed on Nov. 4, 1999.

(51) Int. Cl.
*H04M 3/42* (2006.01)
*H04L 12/16* (2006.01)
*G06F 15/16* (2006.01)

(52) U.S. Cl. .................. 709/204; 370/261; 379/204.01; 379/206.01; 455/416

(58) Field of Classification Search ........ 709/204–205, 709/203; 455/414–416, 518–519; 370/261–262, 370/401; 379/202.01–206.01
See application file for complete search history.

(56) References Cited

U.S. PATENT DOCUMENTS

| 5,642,156 | A | * | 6/1997 | Saiki ........................ 348/14.09 |
| 5,812,653 | A | * | 9/1998 | Jodoin et al. .......... 379/205.01 |
| 5,828,743 | A | | 10/1998 | Pinnell et al. ............... 379/204 |
| 5,889,945 | A | * | 3/1999 | Porter et al. ................. 709/204 |
| 5,896,565 | A | | 4/1999 | Miller ......................... 455/404 |
| 6,002,948 | A | * | 12/1999 | Renko et al. ............... 455/567 |
| 6,330,321 | B2 | * | 12/2001 | Detampel et al. ....... 379/205.01 |
| 6,411,605 | B1 | * | 6/2002 | Vance et al. ................. 370/261 |
| 6,421,324 | B1 | * | 7/2002 | Boyle et al. ................. 370/261 |
| 6,563,914 | B2 | * | 5/2003 | Sammon et al. .......... 379/202.1 |
| 6,564,049 | B1 | * | 5/2003 | Dailley ........................ 455/416 |
| 6,628,767 | B1 | * | 9/2003 | Wellner et al. ......... 379/202.01 |
| 6,798,753 | B1 | * | 9/2004 | Doganata et al. ........... 370/260 |

FOREIGN PATENT DOCUMENTS

CA 2240878 12/1998

OTHER PUBLICATIONS

WAP WTAI; Wireless Application Protocol- Wireless Telophony Application Interface Specification; version 31 May 1999; XP-001028479; 36 pages.
IBM Technical Disclosure Bulletin; "Method for Automatic Conference Calling by Scheduled Calendar Event"; vol. 37 No. 01 Jan. 1994; 1 page.

\* cited by examiner

*Primary Examiner*—Larry D. Donaghue

(57) ABSTRACT

A system and method for providing data network-assisted conference service to a wireless terminal. Conference-related information is received from a conference originator and stored. Prior to conference establishment time, a conference notification message is sent to the wireless terminal. A conference connection request is sent by the wireless terminal in response to the conference notification message, and a conference connection is established between the wireless terminal and a conference bridge that connects all conference participants.

8 Claims, 3 Drawing Sheets

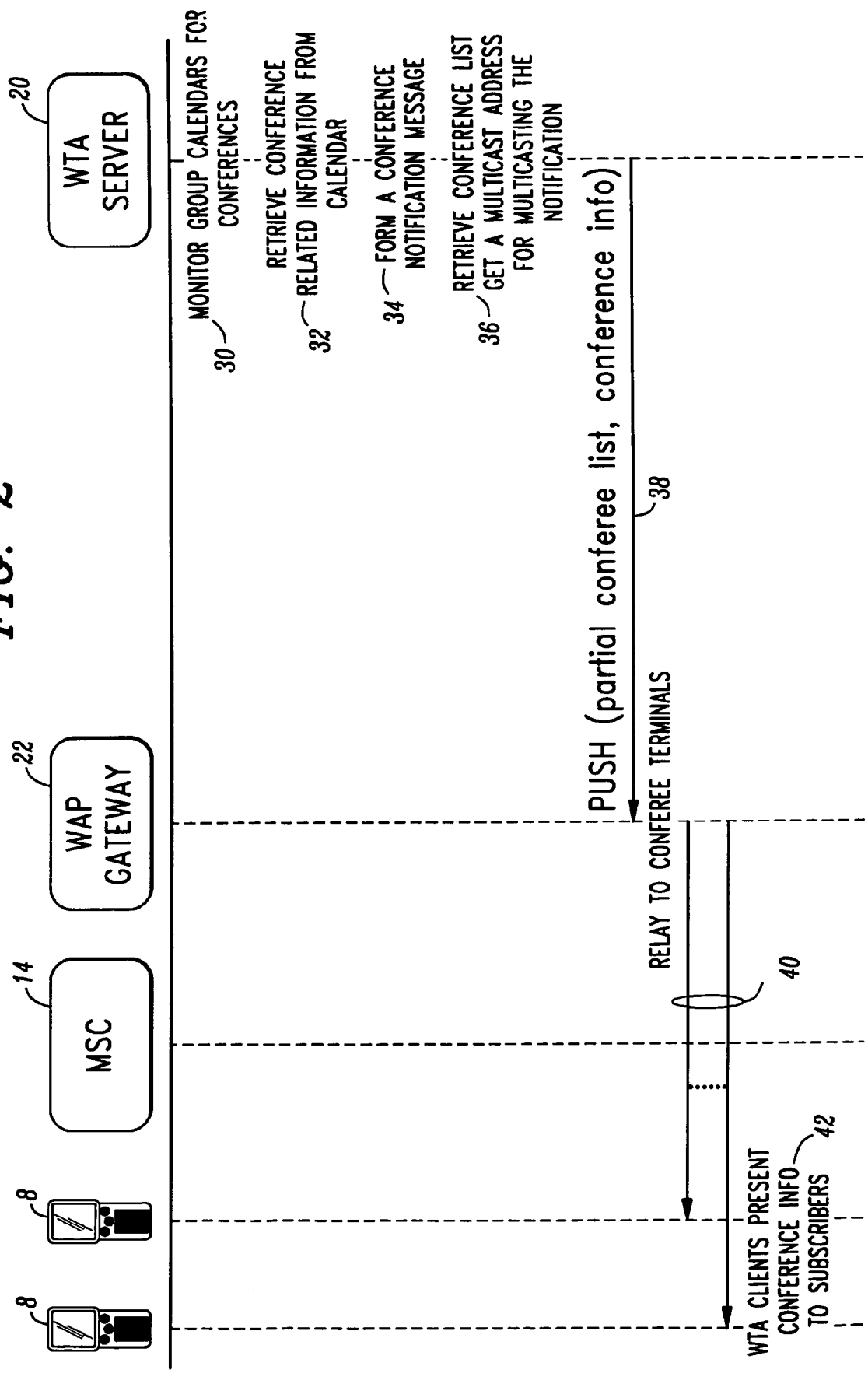

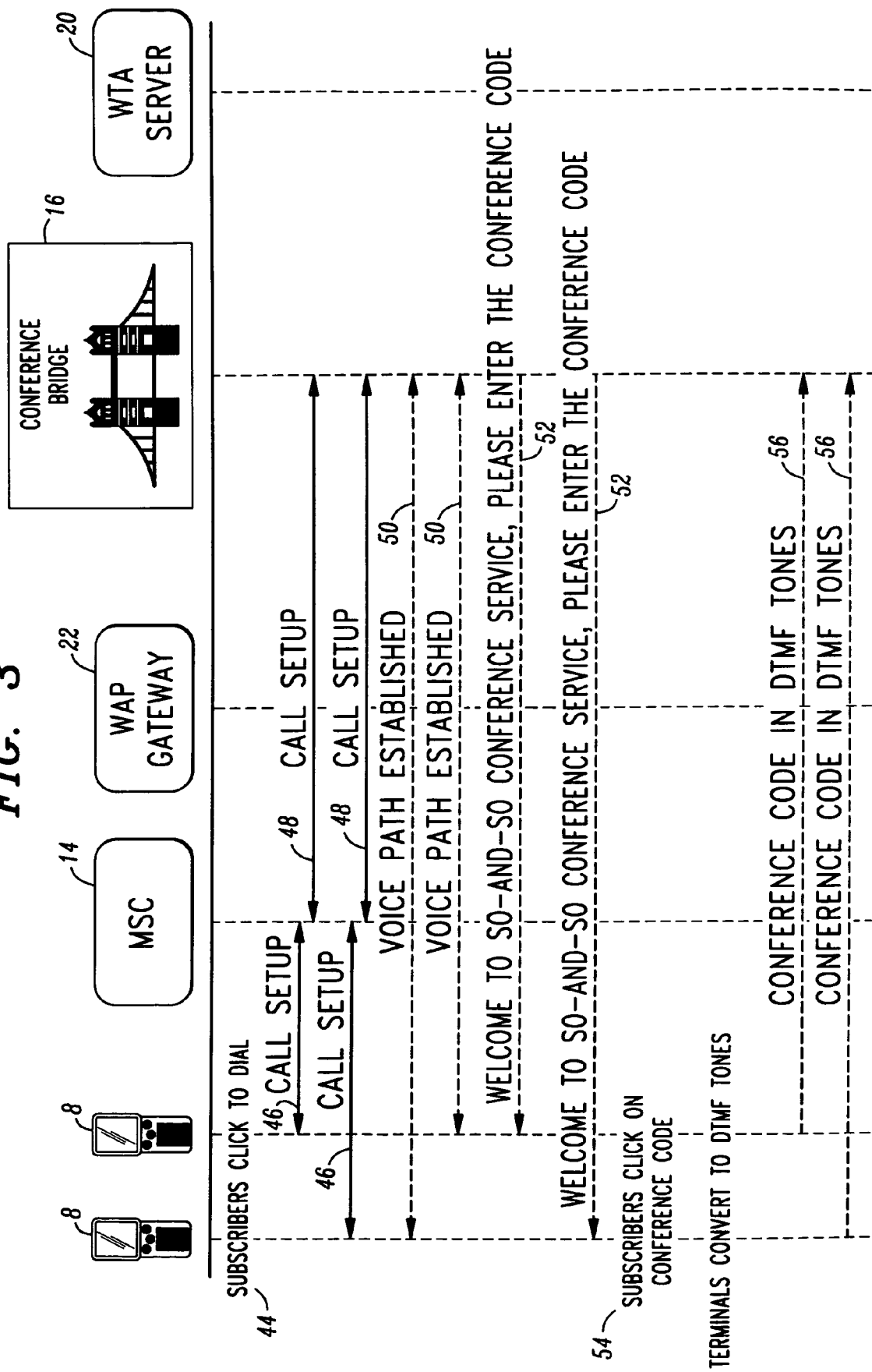

DATA NETWORK-ASSISTED CONFERENCE ESTABLISHMENT

CROSS-REFERENCE TO RELATED APPLICATIONS

This application is related to, and claims benefit of the filing date of, Provisional Application Ser. No. 60/163,646, entitled "Calendar-Based Conference Establishment," filed on Nov. 4, 1999.

STATEMENT REGARDING FEDERALLY SPONSORED RESEARCH OR DEVELOPMENT

Not Applicable

BACKGROUND OF THE INVENTION

1. Field of the Invention

This invention relates to wireless telecommunication systems. More particularly, the invention concerns the establishment of conference calls to wireless terminals in a wireless telecommunication system.

2. Description of the Prior Art

In wireless telecommunication systems, establishing a conference call to wireless terminals involves several steps. First, a conference coordinator needs to convey a conference bridge number and conference code to all participants. Second, all participants need to retain the bridge number and conference code until conference establishment time. Third, all participants need to manually dial the bridge number and enter the conference code at conference establishment time.

It would be advantageous to provide a more efficient way to establish conference calls to wireless terminals in a wireless communication system. What is required is a system and method that preferably eliminates some or all of the manual steps currently required to establish such calls.

SUMMARY OF THE INVENTION

The foregoing problems are solved and an advance in the art is obtained by a novel system and method for providing data network-assisted conference service to wireless terminals. The invention takes advantage of improving wireless technologies, and particularly the new data communication and micro-browsing capabilities now being added to wireless terminals, to implement the support for automated conference notification and setup. In accordance with the invention, conference-related information is received from a conference originator and stored in a data network conference server. Prior to conference establishment time, a conference notification message is sent to the wireless terminal. A conference connection request is then sent by the wireless terminal in response to the conference notification message, and a conference connection is established between the wireless terminal and a conference bridge that connects all conference participants.

In preferred embodiments of the invention, the conference-related information includes a conference establishment time, an identification of conference participants, a conference bridge number and a conference code. The conference notification message is preferably a micro-browser document or the like that is viewable in human-visible form, and which includes the conference-related information. A conference initiation selection object is preferably also displayed, and a conference connection request is initiated in response to the conference initiation selection object being selected.

The conference-related information is preferably received at, and the conference notification message is sent to the wireless terminal from, a data network conference server. The conference server preferably sends the conference notification message to the wireless terminal via a data network gateway. The conference information can include a conference bridge number and a conference code. The conference connection request is preferably received at, and the conference is established by, a conference bridge following an exchange of information with the wireless terminal.

In another aspect of the invention, a data network conference server is disclosed. The conference server is adapted to receive conference-related information from a conference originator, including a conference time, an identification of conference participants, a conference bridge number and a conference code. This information is stored in a database associated with the conference server. The conference server monitors the conference time until the conference is imminent. It then retrieves the conference-related information from its database, forms a conference notification message containing the conference bridge number and the conference code, retrieves addresses for the participating wireless terminals, and sends the conference notification message to the wireless terminals.

In yet another aspect of the invention, a conference bridge is disclosed. The conference bridge is adapted to connect to each wireless terminal and request the conference code from the wireless terminal, perform a validation check on the conference code, and, upon the conference code being successfully validated, form a conference bridge between the wireless terminal and other conference call participants.

In still another aspect of the invention, a wireless terminal is disclosed. The S wireless terminal is adapted to receive, store and display a conference information message, and to display a conference selection menu. The menu may include a make-call selection object for making a call to the conference bridge and a conference code response selection object for sending the conference code. The wireless terminal is also adapted to make a call to a conference bridge in response to the make-call conference selection object being selected, to send a conference connection setup message to the conference bridge, to receive a return message from the conference bridge requesting input of a conference code, to display the conference code response selection object, to generate a conference code message containing the conference code upon the conference code response selection object being selected, and to send the conference code message to the conference bridge.

BRIEF DESCRIPTION OF THE DRAWING

The foregoing and other features and advantages of the invention will be apparent from the following more particular description of preferred embodiments of the invention, as illustrated in the accompanying Drawing, in which:

FIG. 2 is a flow diagram showing a first series of method steps performed to implement the data network-assisted conference service in accordance with the invention; and FIG. 3 is a flow diagram showing a second series of method steps performed to implement the data network-assisted conference service in accordance with the invention.

DETAILED DESCRIPTION OF THE PREFERRED EMBODIMENT

Figure 1:
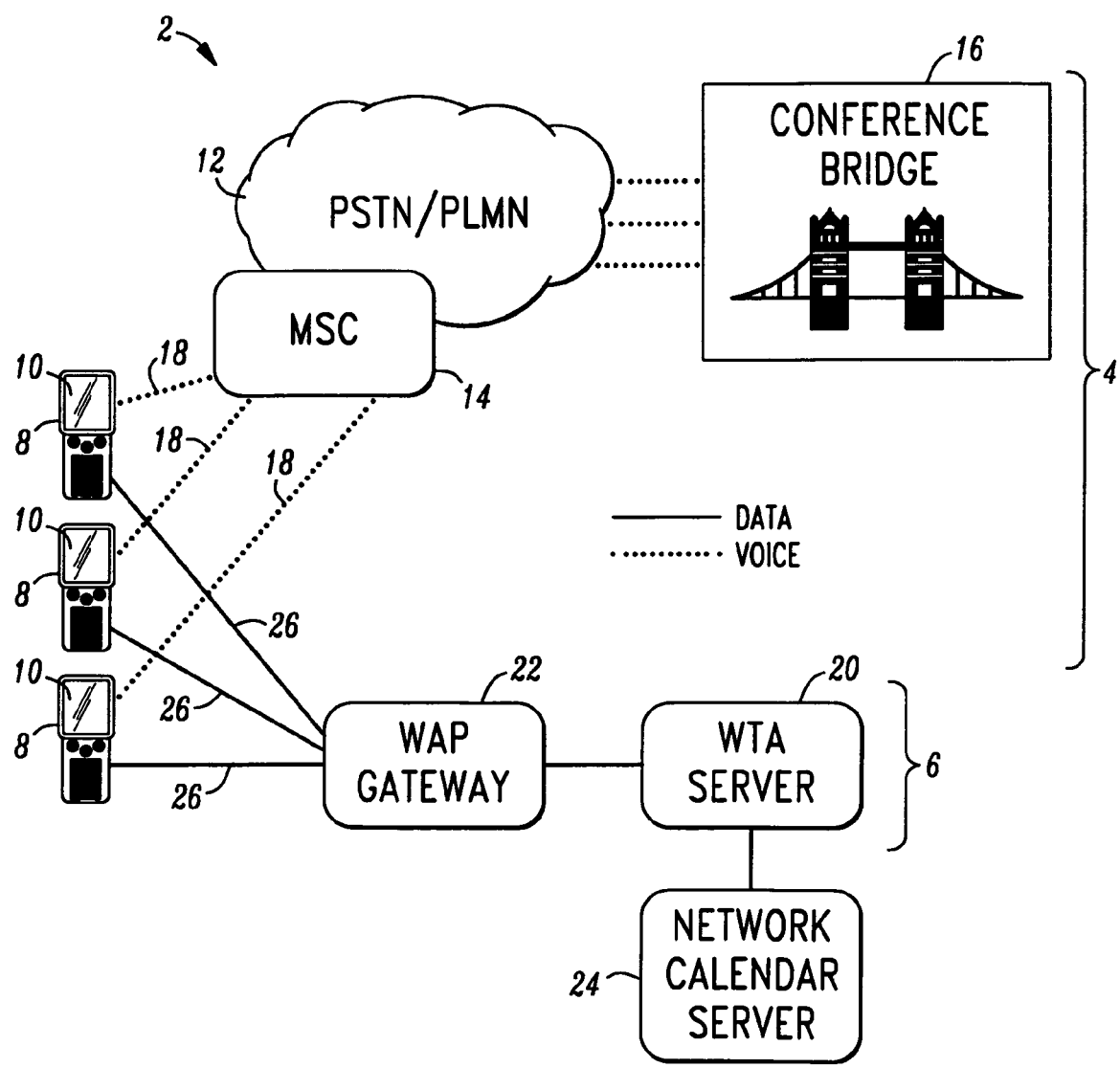
FIG. 1 is a functional block diagram showing a network architecture for a wireless telecommunication system that provides data network-assisted conference service in accordance with the invention.

Turning now to the figures, wherein like reference numerals represent like elements in all of the several views, FIG. 1 illustrates a network architecture for a wireless telecommunication system 2 that provides conference call setup service in accordance with the present invention. As shown, the telecommunication system 2 includes voice network resources 4 and data network resources 6. The voice network resources 4 may be implemented in a conventional telephone network that includes wireless access capability, while the data network resources 6 may be implemented in a conventional packet data network implementing the IP (Internet Protocol) network layer protocol and/or the ATM (Asynchronous Transfer Mode) link layer protocol, and which also has wireless access capability. Alternatively, the voice and data network resources 4 and 6 could be implemented as part of an integrated communication network having features found in both conventional telephone and packet data networks. In FIG. 1, the solid-line resource interconnections represent data pathways, while the dashed-line resource interconnections represent voice pathways.

In the architecture of FIG. 1, there are multiple wireless terminals 8 that are assumed to be powered up in a fully operational mode. Each wireless terminal 8 comprises an integrated wireless telephone and software-controlled data terminal, which preferably implements a WAP (Wireless Application Protocol) micro-browser, or the like, to display WML (WAP Markup Language) documents, or the like, on a display 10. There are a variety of such products on the market today, and others in development.

The voice network resources 4 used to set up conference calls on behalf of the wireless terminals 8 include a PSTN/PLMN (Public Switched Telephone Network/Public Land-based Mobile Network) 12, a Mobile Switching Center (MSC) 14, and a conference bridge 16. Except to the extent that their software programming is modified to perform the functions of the invention, as described in more detail below, each of the foregoing voice network resources 4 is well known in the art. It will be further appreciated that the wireless terminals 8 can be implemented using any $2^{nd}$ Generation or $3^{rd}$ Generation wireless voice communication protocol, including IS-54-B (D-AMPS), IS-136, PCS-1900, DCS 1800 (GSM 1800) GSM 900, IS-95, W-CDMA, GPRS, UMTS, IMT2000, and Mobile IP. The air interface pathways for voice communication are shown in FIG. 1 by reference numeral 18.

The data network resources 6 of FIG. 1 include a data network conference server, a data network gateway, and an optional data network calendar server. More particularly, the data network conference server is preferably a WTA (Wireless Telephony Application) Server 20 implemented in accordance with the Wireless Application Protocol, and the data network gateway is preferably a WAP Gateway 22. The data network calendar server is identified in FIG. 1 as the Network Calendar Server 24. This server is programmed to calendar events such as conferences. Except to the extent that their software programming is modified to perform the functions of the invention, as described in more detail below, each of the foregoing data network resources is well known in the art. If utilized, the Network Calendar Server 24 may store the calendars of conference participants, and determine a conference time that all participants are available for conferencing. As in the case of the terminals 8, the Gateway 22 can be implemented using any $2^{nd}$ Generation or $3^{rd}$ Generation wireless voice communication technologies, including IS-54-B (D-AMPS), IS-136, PCS-1900, DCS 1800 (GSM 1800) GSM 900, IS-95, W-CDMA, GPRS, UMTS, IMT2000, and Mobile IP. The air interface pathways for data communication are shown in FIG. 1 by reference numeral 26.

Referring now to FIGS. 2 and 3, the processing steps performed to provide the conference service on behalf of one or more of the wireless terminals 8 will be described.

Initially, the WTA Server 20 receives conference-related information from a conference originator who provides the information using a conventional data network communication method, e.g., by visiting a web server (not shown) associated with the WTA Server 20. Alternatively, the conference time and participants may be determined by the Network Calendar Server 24 and sent to the WTA Server 20. The conference-related information preferably includes a conference time, identifications of conference participants, a conference bridge number and a conference code. The WTA Server 20 is programmed to store the conference-related information in a database (not shown). This database may be local to the WTA server 20 or it could be remotely located. The conference time can be stored as part of a calendar file that contains the conference times of multiple conferences. The conferences can be one-time-only conferences or they may be recurring conferences.

In step 30, according to its programming, the WTA Server 20 monitors the calendar file to keep track of the conference times for all conferences that are assigned to it for tracking. In step 32, when the WTA Server 20 determines that a conference involving one or more of the wireless terminals 8 is imminent, it retrieves the conference-related information for that conference from the database. For example, the WTA Server 20 could retrieve the conference-related information when the conference time is approximately 5 minutes away.

In step 34, the WTA Server 20 forms a conference notification message. It will be assumed for purposes of the present discussion that this message is formed as a WML (Wireless Markup Language) document and that the wireless terminals 8 implement WAP micro-browsers. In step 36, the WTA Server 20 retrieves a list of the wireless terminals 8 that are identified in the conference-related information and a multicast address that can be used to reach such terminals.

In step 38, the WTA Server 20 sends the conference notification message to the WAP Gateway 22. Again, it is assumed that the WAP protocol is being used. Thus, step 38 is shown as being implemented using a conventional WAP transfer operation known as a PUSH. The conference notification message preferably contains the conference-related information originally provided by the conference originator, including the conference time, identifications of the conference participants, a conference bridge number and a conference code. The WAP Gateway 22 is programmed to receive the conference notification message from the WTA Server 20. If necessary (i.e., if the conference notification message is in a format other than WML, such as HTML), the WAP Gateway 22 can convert the conference notification message to WML document based on the WAE (Wireless Application Environment) specifications, or the like, to facilitate display at the wireless terminals 8. In step 40, according to its programming, the WTA Gateway 22 sends the conference notification message to the wireless terminals 8.

The wireless terminals 8 receive and store the conference notification message from the WAP Gateway 22. In step 42, the wireless terminal micro-browsers display the conference notification message in human-visible form on the respective displays 10. They preferably also display a conference menu containing a make-call conference selection object (not shown). In step 44, shown in FIG. 3, a wireless subscriber selects the make-call conference selection object. The wireless terminals 8 are programmed to respond to this selection by sending call setup requests to the MSC in step 46 that respectively request connections to the conference bridge 16. In step 48, the MSC sets up the call to the conference bridge 16.

In step 50, voice pathways are established between the conference bridge 16 and the wireless terminals 8. In step 52, the conference bridge 16 plays an announcement for the participants to enter the conference code or the conference bridge 16 will request the WTA Server 20 to PUSH the request to the participants. The wireless terminals 8 can be programmed to play the conference-related message in audio form and to display a conference code response selection object in human-visible form on their respective displays 10. In this way, subscribers do not need to remember a conference code. The audio message could request selection of the conference code selection object and the subscriber could respond by simply selecting it. Alternatively, the selection object could itself prompt for the selection. In a still further alternative configuration, an audible conference code prompt could request that dialer pushbuttons be pressed to input the conference code. The wireless terminals 8 would then display the conference code so that subscribers can enter the code without having to remember it. In step 54, the subscribers select the conference code response selection objects or otherwise input the conference code, as the case may be. This causes the wireless terminals 8 to send respective conference code messages to the conference bridge 16 in step 56. This message may be implemented with the conference code being sent as DTMF (Dual Tone Multiple Frequency) tones. If the conference code received from a wireless terminal 8 is correct, the terminal is added to the conference.

Accordingly, novel system and method for providing calendar-based conference service to wireless terminals are disclosed. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a wireless terminal, a method for providing calendar-based conference service at said wireless terminal, comprising the steps of:
receiving a conference notification message containing conference-related information from a data network having a conference server, said conference-related information including a conference time, an identification of conference participants, a conference bridge number and a conference code;
storing said conference-related information;
displaying said conference-related information in human-visible form;
displaying a conference selection input object in human-visible form;
in response to said conference selection object being selected, generating a conference connection request message;
sending said conference connection setup message to a telephone network containing a conference bridge;
receiving a conference-related message and a request for input of a conference code from said conference bridge;
playing said conference-related message in audio form;
displaying a conference code response selection object in human-visible form;
in response to said conference code response selection object being selected, generating a conference code message containing said conference code; and
sending said conference code message to said conference bridge.

2. A method in accordance with claim 1 wherein said conference notification message is received from said conference server via a data network gateway.

3. A method in accordance with claim 1 wherein said conference-related information is displayed on a browser in said wireless terminal adapted to visually display said conference-related information in response to said conference notification message being sent to said wireless terminal.

4. A method in accordance with claim 1 wherein said conference selection object is displayed on a browser in said wireless terminal adapted to visually display said conference selection object and initiate said conference connection request in response to said selection object being selected.

5. A wireless terminal for providing calendar-based conference service at said wireless terminal, comprising:
means for receiving a conference notification message containing conference-related information from a data network having a conference server, said conference-related information including a conference time, an identification of conference participants, a conference bridge number and a conference code;
means for storing said conference-related information;
means for displaying said conference-related information in human-visible form;
means for displaying a conference selection input object in human-visible form;
means, responsive to said conference selection object being selected, for generating a conference connection request message;
means for sending said conference connection setup message to a telephone network containing a conference bridge;
means for receiving a conference-related message and a request for input of a conference code from said conference bridge;
means for playing said conference-related message in audio form;
means for displaying a conference code response selection object in human-visible form;
means, responsive to said conference code response selection object being selected, for generating a conference code message containing said conference code; and
means for sending said conference code message to said conference bridge.

6. A system in accordance with claim 5 wherein said means for receiving a conference notification message is adapted to receive said conference notification message from said conference server via a data network gateway.

7. A system in accordance with claim 5 wherein said means for displaying said conference-related information comprises a browser in said wireless terminal adapted to visually display said conference-related information in response to said conference notification message being sent to said wireless terminal.

8. A system in accordance with claim 5 wherein said means for displaying said conference selection object comprises a browser in said wireless terminal adapted to visually display said conference selection object and initiate said conference connection request in response to said selection object being selected.

* * * * *